Patented July 28, 1925.

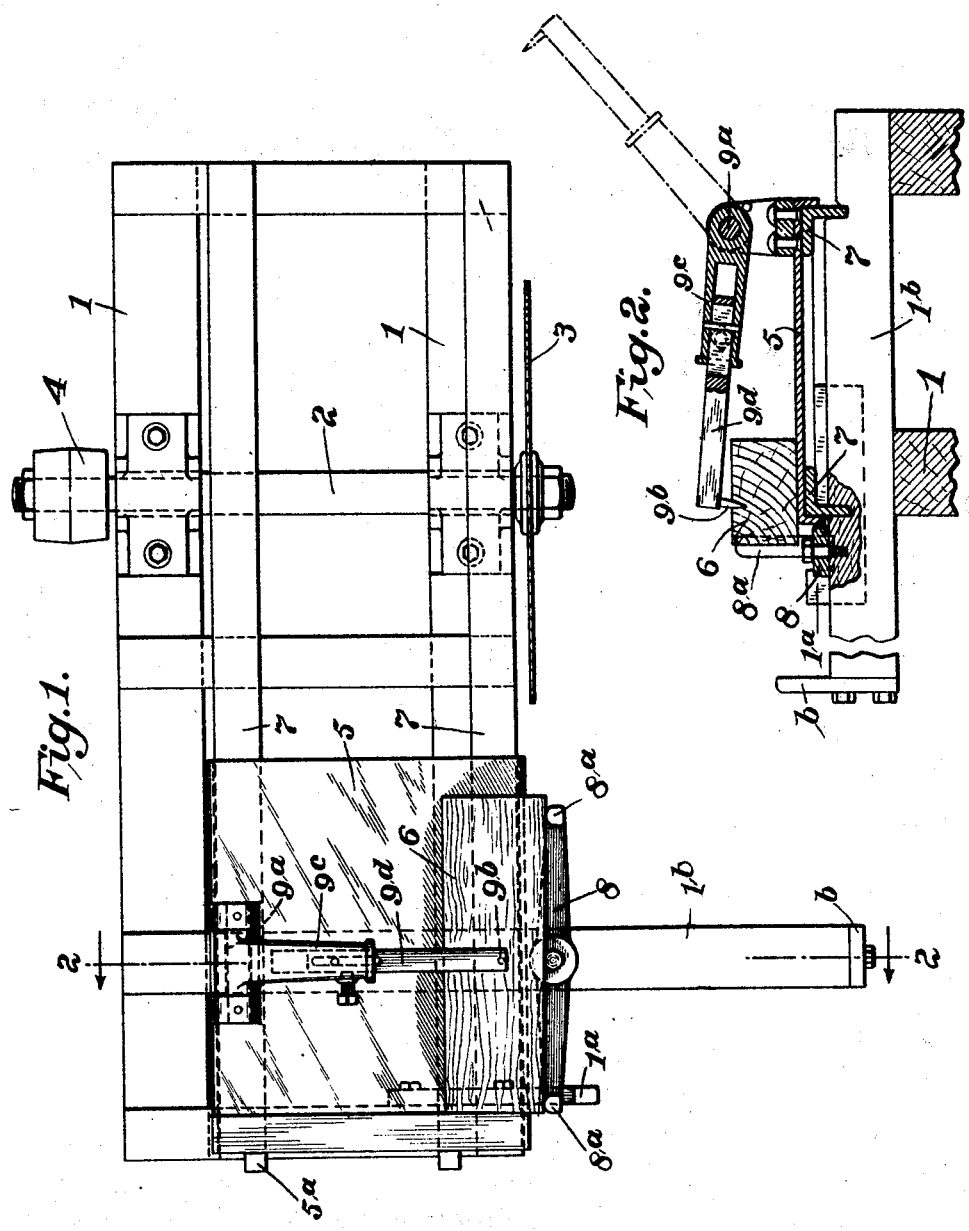

1,547,604

UNITED STATES PATENT OFFICE.

JAMES H. MINER, OF MERIDIAN, MISSISSIPPI.

SHINGLE-SAW MACHINE.

Application filed November 8, 1923. Serial No. 673,509.

*To all whom it may concern:*

Be it known that I, JAMES H. MINER, a citizen of the United States, and resident of Meridian, in the county of Lauderdale and State of Mississippi, have invented certain new and useful Improvements in Shingle-Saw Machines, of which the following is a specification.

My present invention relates to improvements in shingle sawing machines, and aims to provide a simple, economical and efficient machine, or form of apparatus in which the shingle block or "cant" may be manipulated to cut the maximum number of shingles therefrom without danger to the operator.

With this and other objects in view, the invention includes the novel features of construction and arrangement and combination of parts hereinafter described and particularly defined in the appended claims.

An embodiment of my invention is illustrated in the accompanying drawings, in which:—

Figure 1 is a plan view, and

Fig. 2 is a transverse section on line 2—2 of Fig. 1.

It will be understood in these drawings, that no attempt has been made to show in detail parts of the shingle sawing apparatus, outside of the particular portions involving my invention, other parts being shown in a conventional manner.

Referring by reference characters to this drawing, the numeral 1 designates the frame of the machine, which may be of the ordinary or any desired construction, and which is provided with a saw shaft 2 journaled in suitable bearings and carrying at one end a circular saw 3, and at the opposite end a drive pulley 4 designed to be driven by a belt from any suitable source of power. Upon this frame is slidably mounted a table or slide 5, for supporting the block 6 from which the shingle is to be cut, this slide being mounted upon guide rails 7 so as to have a rectilinear motion in the plane of the saw, it being of course, understood that the slide or table has its upper surface parallel to this plane, or in other words, in a plane parallel to the axis of the saw. The table or slide in the simple form of the machine illustrated in these drawings, and in which my invention is embodied, is designed to be reciprocated by hand to effect the cutting of the shingles, but it is of course, obvious that power could be employed if desired for this reciprocating purpose. Stops 5ª limit the backward movement of the carriage.

The position of the shingle block relative to the saw for gauging the cut, is determined by a tilting gauge comprising a horizontally disposed bar 8 fulcrumed on a vertical pivot carried by the frame of the machine, and having upstanding gauge fingers 8ª which may be integral with the bar, and which are positioned so that when the table or slide is in its retracted position, these fingers engage the outer face of the block, the limited tilting of the gauge on its vertical axis limited by stop 1ª determining the position of the block relative to the saw, and whether the saw will cut the thick or the thin edge of the shingle first, as will be well understood by those skilled in the art. It will be understood that in the simple embodiment of my invention shown, the tilting of the block upon the table is effected by the hands of the operator, and thereafter it is maintained in position by its weight, supplemented by the pressure of the hands of the operator, as the table or slide is moved forward to cause the saw to sever the shingle.

As the block narrows in width, from the cutting of successive shingles therefrom, it finally reaches a point where it would be dangerous to the operator to hold it firmly during the movement of the table or carriage, and this has, in the past, resulted in the waste of much good shingle material. To avoid this, I provide a dogging device in the shape of a lever arm 9, fulcrumed upon a horizontal pivot 9ª at the rear of the table, and provided with one or more projections 9ᵇ. This dogging arm is capable of being swung back out of the way in the position shown in dotted lines in Fig. 2, during the initial cutting of the block, but after the block has been cut to a point where it is unsafe for the operator to hold it directly by his hands, the dogging lever is thrown down with a hammer action, into the position shown in full lines in Fig. 2, causing the projection to penetrate the upper surface of the shingle block. The lever 9 is fulcrumed on the slide or carriage at a point midway of the length of the shingle block so that the projection 9ᵇ, when in engagement with the shingle block, does not prevent the action of the tilting gauge. The lever is made in two parts, slidingly or telescopically connected together, and this may conveniently be accomplished by providing an inner part 9ᶜ pivoted to the table as aforesaid, this part having a non-circular longitudinal opening to slidably engage an outer non-circular bar member 9ᵈ, which is provided with the projection or projections aforesaid.

Another feature of the present invention is the provision of means by which the apparatus may be readily used to cut the shingle blocks of the required lengths preparatory to their being divided into shingles. To accomplish this, the tilting member 8 is made readily removable by having its pivot pin detachably connected with the horizontal frame member 1ᵇ, and this frame member or bar is projected to the front or saw side of the machine and provided with an upstanding abutment or stop member $b$. By removing the tilting member 8, and positioning the carriage so that a shingle slab may be placed on the carriage between its end abutment 5ᵇ and the fulcrum lugs of dogging lever 9, the end of the slab may be positioned against stop $b$ which gauges the slab for cutting the proper length block, when the carriage is moved toward the saw. During this operation the dogging lever may be swung back out of the way, as shown in dotted lines in Fig. 2.

Having thus described my invention, what I claim is:—

1. In a shingle saw machine of the class described, the combination with the traveling block supporting carriage having a tilting gauge for the block, of a single lever arm supported above the carriage and disposed in a plane passing through the axis of said gauge, said lever arm having a projection for engaging the block midway of the length thereof.

2. In a shingle sawing machine of the class described, the combination with the travelling carriage, of a lever arm pivotally supported above the carriage, and having a slidable part carrying a block engaging projection.

3. In a shingle sawing machine of the class described, the combination with the travelling carriage, of a lever arm pivotally supported above the carriage, and having a slidable part carrying a block engaging projection, said lever being pivoted at a point midway of the length of the carriage so that the projection will engage the block centrally of the length thereof.

In testimony whereof, I affix my signature.

JAMES H. MINER.